(12) United States Patent
Henke et al.

(10) Patent No.: US 8,579,149 B2
(45) Date of Patent: Nov. 12, 2013

(54) DRINKING VESSEL HOLDER HAVING A LIFTING DEVICE

(75) Inventors: Hans Henke, Grosslangheim (DE); Roman Funk, Schwarzach (DE); Walter Mehling, Veitshöchheim (DE)

(73) Assignee: F.S. Fehrer Automotive GmbH, Kitzingen (DE)

( * ) Notice: Subject to any disclaimer, the term of this patent is extended or adjusted under 35 U.S.C. 154(b) by 45 days.

(21) Appl. No.: 13/247,673

(22) Filed: Sep. 28, 2011

(65) Prior Publication Data

US 2012/0091157 A1 Apr. 19, 2012

(30) Foreign Application Priority Data

Oct. 13, 2010 (DE) .................. 10 2010 048 207

(51) Int. Cl.
*B65D 8/14* (2006.01)
*B65D 90/12* (2006.01)

(52) U.S. Cl.
USPC ............ 220/737; 220/8; 220/634; 224/926; 248/311.2

(58) Field of Classification Search
USPC .......... 220/8, 345.1, 628, 629, 632, 634, 694, 220/737; 224/275, 926; 248/311.2; 296/24.34
See application file for complete search history.

(56) References Cited

U.S. PATENT DOCUMENTS

| 6,217,112 B1 | 4/2001 | Linsenmeier et al. | |
| 6,705,580 B1 * | 3/2004 | Bain | 248/311.2 |
| 7,416,161 B2 * | 8/2008 | Shin | 248/311.2 |
| 7,694,928 B2 * | 4/2010 | Lee et al. | 248/311.2 |
| 7,757,888 B2 * | 7/2010 | Ogura | 220/737 |
| 2005/0269472 A1 * | 12/2005 | Wagner et al. | 248/311.2 |
| 2006/0243875 A1 * | 11/2006 | Chen | 248/311.2 |

FOREIGN PATENT DOCUMENTS

| DE | 29619478 U1 | 11/1996 |
| DE | 19930524 A1 | 2/2000 |
| DE | 102004014291 A1 | 9/2005 |
| DE | 102004021685 A1 | 11/2005 |
| DE | 102005028586 A1 | 1/2007 |
| DE | 102007045614 A1 | 4/2009 |
| FR | 2903948 A1 | 1/2008 |

* cited by examiner

Primary Examiner — Steven A. Reynolds
Assistant Examiner — Javier A Pagan
(74) Attorney, Agent, or Firm — Quarles & Brady LLP (57) ABSTRACT

A drinking vessel holder includes a drinking vessel receptacle arranged in a housing and a height-adjustable bottom element. The bottom element is arranged in the drinking vessel receptacle and can be displaced between an upper rest position and a lower set-down position, wherein a drinking vessel can be set down on the bottom element in the drinking vessel receptacle. A positionally adjustable supporting element prevents the drinking vessel from toppling over, and wherein the bottom element in the drinking vessel receptacle forms a first piston or else is connected to a first piston and the supporting element forms an annular piston between the housing and the drinking vessel receptacle or else is connected to at least one second piston, wherein movement of at least one of the first piston, the second piston, and the annular piston causes fluid overpressure and fluid underpressure.

13 Claims, 5 Drawing Sheets

DRINKING VESSEL HOLDER HAVING A LIFTING DEVICE

CROSS-REFERENCE TO RELATED APPLICATIONS

The present application claims the benefit of German Patent Application No. 10 2010 048 207.2 filed Oct. 13, 2010, which is fully incorporated herein by reference.

The present invention relates to a drinking vessel holder for use in a vehicle in an embodiment, wherein the holding depth is variable according to the preamble of Claim 1.

From the state of the art manifold embodiments of drinking vessel holders are known. In this context, there are embodiments which employ no mechanical or adjustment mechanisms whatsoever and there are embodiments which employ devices for adjusting the bottom plane or for altering the position of supporting elements or the like.

Utility model DE 20 2007 016 332 U1 discloses a drinking vessel holder, wherein the holding depth can be enlarged or else reduced by altering the bottom. Here, in an advantageous embodiment, an upper annular receiving element and a lower annular receiving element are provided. Said elements are arranged so as to be displaceable relative to each other. The supporting bottom element is connected to the lower annular receiving element. The insertion of the lower element into the upper element makes it possible to significantly reduce the installation depth. To enable the utilization as a drinking vessel holder, the inner receiving element is consequently displaced downwards. By means of this measure, it is easily possible to achieve a larger depth for the vessel to be received. Hence, a significantly improved support function is provided for the drinking vessel to be received.

Moreover it is known from the state of the art to arrange supporting elements at drinking vessel holders in a swivelable or foldable manner. Here, in the inoperative position, said supporting elements are arranged so as to be retracted and can be folded out for utilization as a drinking vessel holder. An example of such an embodiment is shown in utility model DE 296 19 478 U1. Here, an annular bracket is disposed at a cover so as to be swivelable. This cover in turn can equally be folded out from a carrier part. Thus, it is possible to transfer said annular supporting element into a position above a cup holder with the aid of a double-swiveling action. By means of this measure, the drinking vessel to be received in turn can be safely set down. In the case of non-use, it is likewise possible to fold up said supporting element in a compact manner.

In the second embodiment it is particularly advantageous that the cup holder in the inoperative position is closed by means of a cover. As a result, the surface is even and the cup holder does not emerge.

It is a drawback of the known embodiments, which have a compact structure in the inoperative position, in particular that maintaining the advantageous support function of the drinking vessel holder requires the necessary retaining elements or the bottom to be folded out or to be displaced or the like, prior to setting down a drinking vessel. For this reason, it is firstly necessary to prepare the drinking vessel holder for receiving the drinking vessel.

Thus, it is an object of the present invention to provide a drinking vessel holder which enables a compact configuration in the inoperative position and which simultaneously provides an advantageous support function, wherein a changeover from the rest position into the set-down position does not necessitate prior operation steps but the displacement can be directly performed by setting down the drinking vessel.

This object is attained by an inventive drinking vessel holder according to the teaching of Claim 1.

Advantageous embodiments of the invention are the subject-matter of the dependent claims.

A generic drinking vessel holder features a drinking vessel receptacle which is arranged in a housing. Here, it is irrelevant whether the housing and the drinking vessel receptacle form one component or are composed of two separate components which are disposed inside each other. The drinking vessel receptacle at least surrounds a receiving space in which the drinking vessel can be set down.

Moreover, the drinking vessel holder features a height-adjustable bottom element. Here, the bottom element on the side facing toward the receiving space, as a rule, is configured so as to be flat. Here, elevations or other structures can equally be provided on the set-down surface of the bottom element in order to enable an advantageous set-down of the drinking vessel. The specific embodiment is not of further importance for the present invention. At least the bottom element can be displaced in the drinking vessel receptacle between an upper rest position and a lower set-down position. Thus, the bottom element executes a movement according to the set-down movement of the drinking vessel to be accommodated.

Moreover, the drinking vessel holder comprises a positionally adjustable supporting element, wherein the supporting element in the set-down position is disposed above the drinking vessel receptacle and prevents the drinking vessels from toppling over. Hence, the generic drinking vessel holder in the rest position has a compact configuration and can be changed over to a set-down position for utilization, wherein the holding depth of the drinking vessel holder in the set-down position is enlarged with respect to the rest position.

According to the invention, the bottom element in the drinking vessel receptacle is configured such that it forms a piston. Moreover, the supporting element is disposed between the housing and the drinking vessel receptacle and is configured such that it forms an annular piston. In terms of a piston function, the movement of the piston and/or of the annular piston can cause fluid overpressure and/or fluid underpressure in the chamber which is delimited by the piston or the annular piston.

By means of the newly created solution it is possible for the first time to effect both a movement of the bottom element and simultaneously a movement of the supporting element by setting down a drinking vessel. Here, the displacement volume in the piston chamber below the bottom element and in the annular piston chamber below the supporting element is advantageously employed to enable mutual interaction. By means of this measure, it is easily possible to set down a drinking vessel on a bottom element which is arranged in the rest position, and to cause lifting of the supporting element simultaneously with the lowering of the bottom element as a result of the subsequent movement of the drinking vessel.

As a result, it is not necessary to prepare the drinking vessel holder for utilization beforehand. The drinking vessel holder can be used out of the rest position directly for setting down the drinking vessel and thus can be easily manipulated with one hand. To implement the advantageous solution it is obvious to make provision for a fluid flow between the piston and the annular piston.

In another alternative embodiment it is possible to make provision for specific piston-cylinder arrangements instead of designing the bottom element in the form of a piston or else the supporting element in the form of an annular piston. Thus, on the one hand one or, where appropriate several, piston/s can be disposed below the bottom element. By the same token at least one piston can be arranged below the supporting element, wherein due to the annular geometry at least two pistons need to be employed at the supporting element. This mode of action is analogous to the previous embodiment, wherein the bottom element forms a piston and the supporting element forms an annular piston.

Hereinafter the embodiment which employs specific pistons will not be explained any further, wherein the use of the present invention by employing specific pistons will be readily apparent for the skilled person.

The embodiment wherein the bottom element and/or the supporting element is/are lifted when there is fluid overpressure below the element is particularly advantageous. It is obvious that the advantageous functioning requires the movement of one element to cause a movement of the other element. Here, it is particularly advantageous to employ the overpressure below the one element in order to cause lifting of the other element by means of said overpressure. Here, the embodiment wherein the supporting element is lifted when the bottom element is lowered is particularly advantageous.

By the same token it is advantageous if the bottom element and/or the supporting element is/are lowered when there is fluid underpressure below the respectively other element. In particular during the automatic movement of one element in relation to the other element, when the movement is reversed, it is advantageous to retract the second element when lifting the first element.

Here, it is particularly advantageous if a compression spring is disposed below the bottom element. Here, the compression spring can lift the bottom element out of the set-down position into the rest position. By means of the compression spring the return into the initial state in the rest position is realized in a particularly easy manner. Hence, manual lifting of the bottom element for reaching the rest position is not required.

This embodiment is particularly advantageous in conjunction with the fluid underpressure. Here, when the bottom element is lifted, fluid underpressure can be generated by means of the compression spring below the bottom element in response to the piston function thereof. This fluid underpressure at the same time acts in the annular piston chamber below the supporting element serving as an annular piston. As a result, the underpressure generated by the compression spring causes a downward movement of the supporting element into its initial position or into the rest position.

Particularly advantageously air is used as a fluid, so that no additional medium is required. Moreover, by means of using air it is not necessary that the piston and the annular piston are completely sealed, as is otherwise generally common. Instead, it is sufficient if an airflow leads to an overpressure or an underpressure at the corresponding piston or annular piston, wherein a leakage airflow escaping between gaps or other leaks is irrelevant as regards the functionality.

With respect to the design of the piston and the annular piston it is firstly irrelevant if the same have a circular shape or any other shape. However, it is particularly advantageous if the elements, in particular the drinking vessel receptacle, the supporting element and the bottom element, in the region of the piston function or the annular piston function are designed with a circular shape. By means of this measure, it is particularly easy to realize the necessary adjustments with respect to the shape and fitting of the elements. Moreover the guiding function of the bottom element and the supporting element is enhanced by the circular shape.

Here, it is advantageous if only a small gap or else no gap is provided between the bottom element serving as a piston and the drinking vessel receptacle and/or between the supporting element serving as an annular piston and the drinking vessel receptacle and/or between the supporting element serving as an annular piston and the housing. This requires a gap with a size which is at least smaller than 0.3 mm. However, it is particularly advantageous if the gap is selected so as to be smaller than 0.1 mm.

Here, it is not in any case necessary that the elements are completely to sealed. Instead, it may be advantageous if a minimal gap is provided. Hence, on the one hand, easy guidance of the elements with respect to each other is realized. A small gap is irrelevant as regards the piston function provided that the displacement volume corresponding to the geometric dimensioning is sufficiently large in order to compensate for the leakage loss owing to the gap.

This applies in particular to a mode of operation where the bottom element by means of its lowering movement generates overpressure below the piston and said overpressure simultaneously acts in the annular piston and causes lifting of the supporting element. Since the volume below the bottom element can easily have a significantly larger size in contrast to the volume below the annular piston, a displacement volume that is significantly larger than what would be required for lifting the supporting element can thus be realized. Thus, it is especially advantageous if a gap is provided so that an inadmissibly large overpressure is not produced at the bottom element, which would otherwise counteract the setting down of a drinking vessel.

Here, it is particularly advantageous if the bottom element along its circumference forming the piston and/or the supporting element along its inner and/or outer circumference forming the annular piston features at least one annular elevation serving as a guide as well as for tolerance compensation. By means of providing specific annular elevations, it is firstly particularly easy to carry out the adjustment to the general manufacturing tolerances in the manufacturing tool. Moreover, said elevations have a favorable impact on the guiding properties in their function as a piston or annular piston.

If the volume difference below the piston in relation to the annular piston is not sufficiently large and a gap formed between the elements leads to an inadmissibly large leakage loss, it is particularly advantageous if a sealing lip is arranged in addition to or instead of the previously described elevation. Said sealing lip at the same executes a guiding function and enables tolerance compensation.

Here, it is particularly advantageous if the sealing lip in its function as a soft component is integrally connected to the respective component, i.e. to the bottom element or the supporting element. This can be performed in a manner known to the person skilled in the art using a 2K injection molding process.

To ensure that the bottom element remains in the set-down position, it is particularly advantageous if a latching function is provided. In this regard, it is particularly advantageous if the bottom element and/or the supporting element latches when the bottom element is depressed into the set-down position, and a backward movement into the rest position is prevented. Thus, when a set-down position has been occupied once and when the drinking vessel is subsequently removed, the drinking vessel holder remains in its functional position or set-down position.

Even though this aspect is firstly irrelevant, this embodiment in particular ensures that inadmissible vibration movements are not caused below the bottom element for instance by a compression spring. Hence, the drinking vessel remains in its initial position in the set-down position even in the case of slight impacts and is not set into vibration by means of an otherwise statically indeterminate system.

When a latching engagement is used, it is particularly advantageous if the latching engagement is released by pressing or depressing the supporting element once slightly from above. Thus, it is sufficient to shortly press on the supporting element once from above in order to change the drinking vessel holder from the set-down position back into the rest position. In this way the latching engagement is released, and the elements can consequently be moved back into their rest position by means of an available activation mechanism. As previously mentioned, in a particularly advantageous manner this activation mechanism may be a compression spring being disposed below the bottom element and serving as the driving force which by means of the underpressure in the fluid enables the movements in the piston chamber and in the annular piston chamber.

In an advantageous manner the latching function is produced by a swivelable adjusting lever which is vertically disposed between the drinking vessel receptacle and the supporting element and by a latching element which is coupled thereto and is horizontally disposed below the bottom element. Hence, a movement of the supporting element may have an impact on the latching function below the bottom element. Moreover it is advantageous if the bottom element is coupled at the housing with the aid of the latching element.

To implement the mode of operation, i.e. that the latching element automatically latches when the bottom element is lowered and unlatches in response to a pressure on the supporting element, it is particularly advantageous if the upper end of the adjusting lever is pressed against the supporting element with the aid of an elastic spring function. In response to the pressing of the adjusting lever against the supporting element, if the geometry of the adjusting lever and the supporting element is advantageously selected, a swivel movement of the latching element is realized by the height-adjustability of the supporting element.

In order to further secure the position of the drinking vessel in the drinking vessel holder it is particularly advantageous if a plurality of swivelable retaining elements is disposed in the supporting element. Here, the retaining elements are configured such that in the rest position they are arranged so as to be swiveled into an intermediate space between the supporting element and the drinking vessel receptacle and in the set-down position are arranged so as to be swiveled into the receiving space.

In response to the lifting movement of the annular supporting element in its arrangement on the outside of the drinking vessel receptacle it is consequently necessary to move the retaining elements which are mounted at the supporting element in the rest position into said intermediate space between the drinking vessel receptacle and the supporting element. Here, each retaining element in a particularly advantageous manner features a scoop-like shape. Hence, the retaining element can be mounted in the annular intermediate space.

It is particularly advantageous if each retaining element is pressed by a spring element toward the center of the drinking vessel holder or the drinking vessel to be retained. Hence, the spring function exerts the necessary retaining pressure for securely positioning the drinking vessel. In this context, the selection of the embodiment of the spring element is initially optional. The spring element can be embodied in the form of a soft component which is firmly mounted at the retaining element or, preferably, may be embodied in the form of a torsion spring which is disposed on the rotational axis of the respective retaining element, or else may be embodied in the form of a leaf spring.

To ensure the automatic inward and outward swiveling of the retaining elements between the rest position and the set-down position, it is particularly advantageous if each retaining element features a sliding edge or a sliding surface which can slide along an upper edge of the drinking vessel receptacle. Hence, when the supporting element is lowered, an automatic backward swiveling of the retaining element into the intermediate space can be effected.

In the following figures an advantageous embodiment is illustrated by way of example.

In the drawings.

Figure 1:
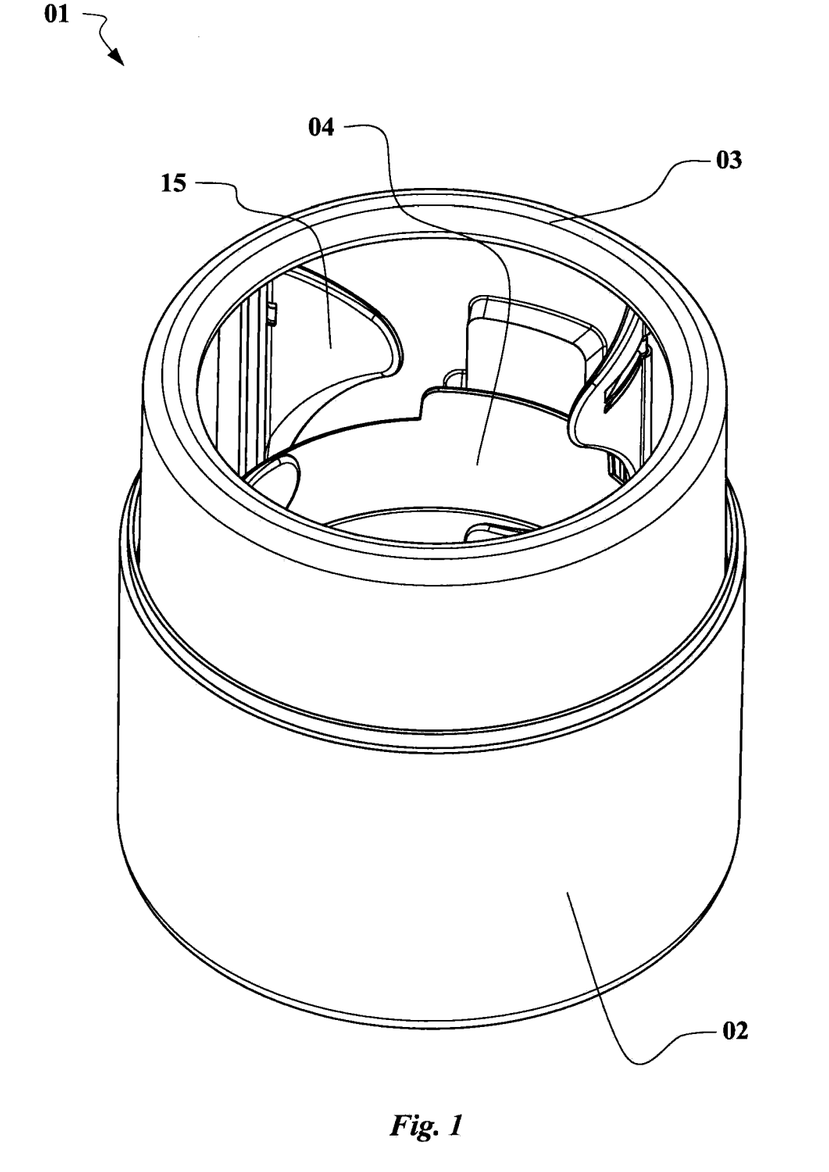
FIG. 1 is a perspective view of an exemplary inventive embodiment of a drinking vessel holder 01 in the set-down position.

FIG. 1 schematically illustrates in a perspective view an exemplary drinking vessel holder 01 in a possible inventive embodiment. Here, the drinking vessel holder 01 firstly features a circular shape. This shape is particularly advantageous in the present case, since thus the adjustment of the elements to each other is enhanced and a secure movement and dimensional accuracy can be realized. Moreover, the circular shape constitutes the typical embodiment of drinking vessel holders. The drinking vessel holder 01 initially comprises the surrounding housing 02. The supporting element 03 is disposed therein so as to be displaceable. The drinking vessel receptacle 04 in turn is disposed within the supporting element 03. The retaining elements 15 are also shown in FIG. 1.

Figure 2:
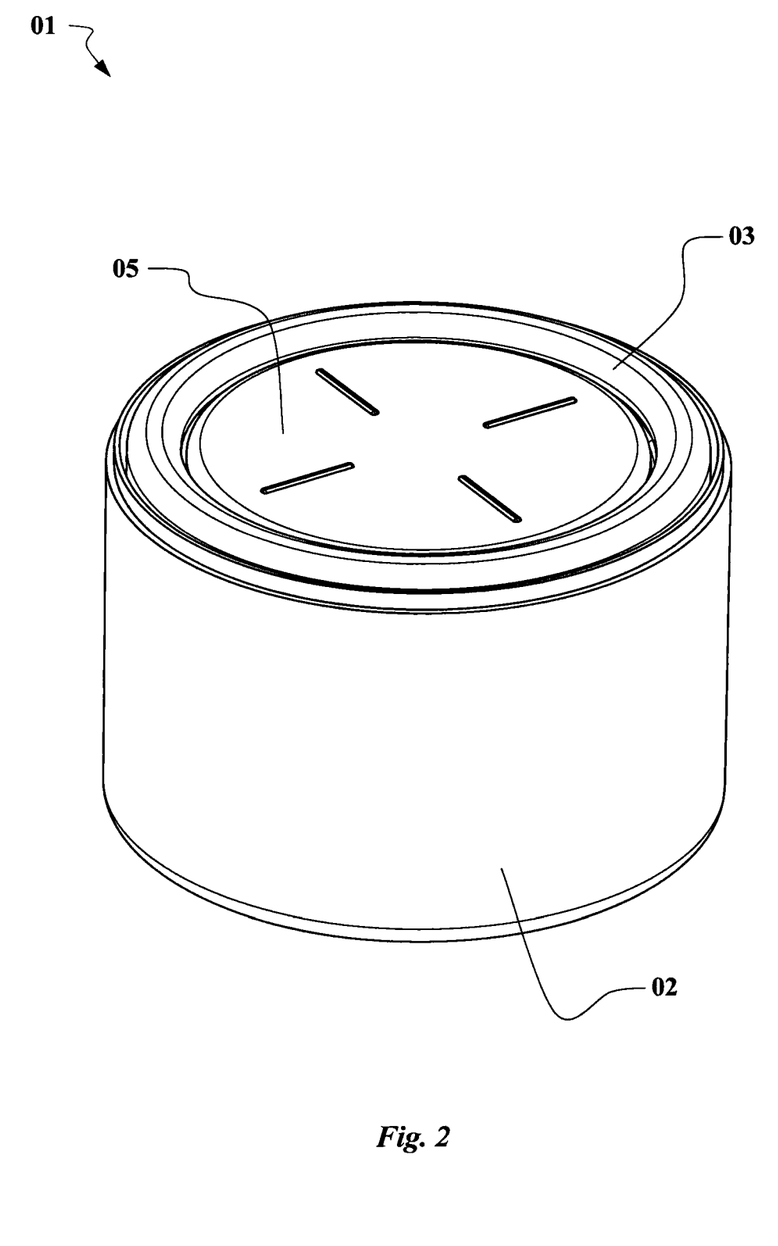
FIG. 2 illustrates the drinking vessel holder 01 of FIG. 1 in the rest position.

FIG. 2 schematically illustrates the drinking vessel holder 01 of FIG. 1 in the rest position. In the drinking vessel holder 01 again the housing 02 is shown which has the supporting element 03 disposed therein. Here again, the drinking vessel receptacle within the drinking vessel holder 01 is not illustrated. On the other hand, the bottom element 05 is arranged so as to be essentially flush with the upper surface.

Figure 3:
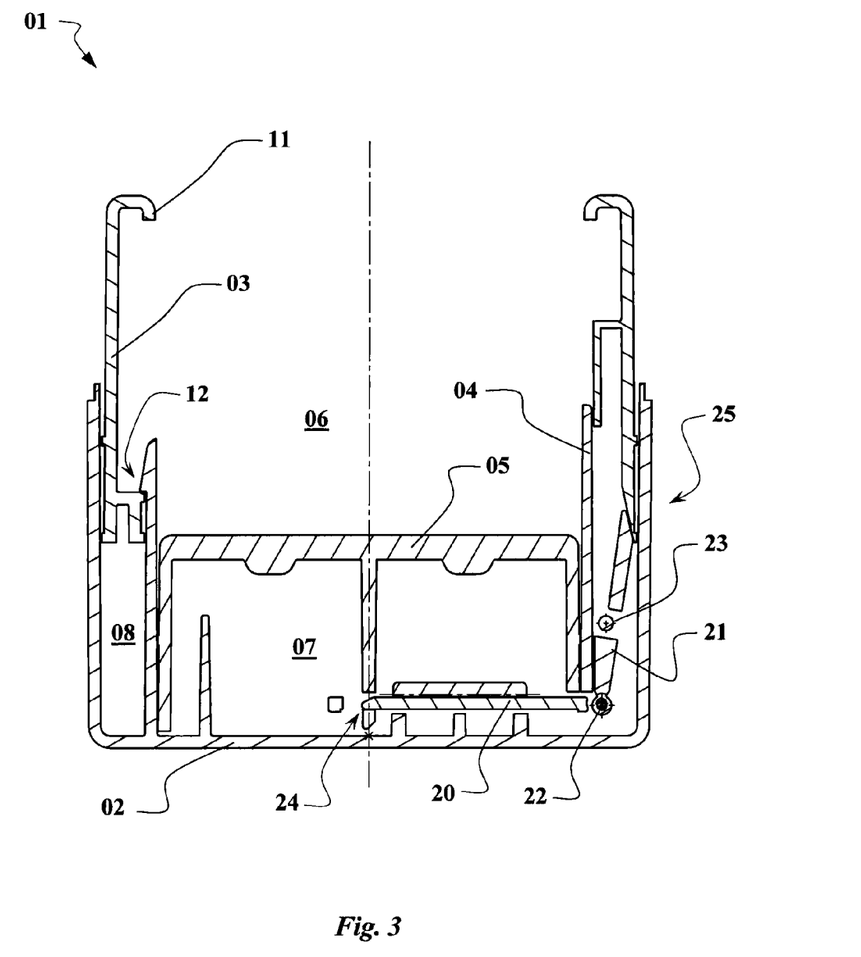
FIG. 3 illustrates a first sectional view of the drinking vessel holder 01 of FIG. 1 in the set-down position.

FIG. 3 schematically illustrates a first cross-section of the drinking vessel holder 01 of FIG. 1. Here, in particular the inventive structure is clearly shown. The drinking vessel holder 01 is firstly composed of the surrounding housing 02 which forms both the outer wall and the delimiting bottom of the drinking vessel holder 01. The supporting element 03 is arranged therein so as to be displaceable and as such has an annular shape and is mounted in the housing 02 so as to be displaceable in the manner of an annular piston. Here, the annular piston or the supporting element 03 delimit an annular piston chamber 08 in the upward direction. The annular piston chamber 08 is delimited by the drinking vessel receptacle 04 toward the center of the drinking vessel holder 01. Said drinking vessel receptacle in turn has an annular shape. As a result of this annular shape the supporting element 03 slides between the housing 03 and the drinking vessel receptacle 04. Here, the drinking vessel receptacle 04 in turn defines the receiving space 06 in which the drinking vessel can be set down. According to the invention, the bottom element 05 is disposed within the drinking vessel receptacle 04. Here, the bottom element 05 forms a piston and delimits the piston chamber 07 in the upward direction.

With the aid of the previously described elements, the mode of operation can be described in the exemplary inventive embodiment. Starting from the rest position, see here also FIG. 4, in which the bottom element 05 is disposed in an elevated position, the piston chamber 07 is reduced in size when the bottom element 05 is lowered. As a result, overpressure is produced in the piston chamber 07. Due to the open connection between the piston chamber 07 and the annular piston chamber 08, overpressure is consequently simultaneously produced in said annular piston chamber 08. Starting from the rest position, said overpressure causes lifting of the supporting element 03 in the direction of the illustrated set-down position.

The illustrated figure also shows the supporting ring 11 of the supporting element 03. It is apparent that a set down drinking vessel can be supported at the supporting ring 11 to prevent toppling over. Hence, the elevated position of the supporting ring 11 with respect to the lower bottom element 05 advantageously enables a secure positioning of the drinking vessel to be received.

The securing of the supporting element 03 against completely falling off from the corresponding guide in the drinking vessel holder 01 is performed with the aid of a locking clip engagement 12. Here the locking clip function can be realized in a simple manner by providing an elastic overlap between the supporting element 03 and the drinking vessel receptacle 04. Hence, the supporting element 03 can easily be inserted into the annular piston chamber 08 and is automatically clip-locked and thus prevents removal.

The compression spring which is preferably required for this embodiment is not illustrated. Said compression spring has to be disposed in the piston chamber 07 between the bottom element 05 and the bottom of the housing 02. The positioning thereof will be obvious for the person skilled in the art.

FIG. 3 also schematically illustrates the latching function. To implement this function, a horizontally disposed latching element 20 is used which is arranged in the housing. This latching element is connected to the adjusting lever 21 via a coupling 22. The adjusting lever 21 in turn is disposed in the annular piston chamber in a mainly vertical position. In the illustrated set-down position, the adjusting lever 21 is supported against the supporting element 03 via an abutment 25 while being swiveled about the swivel bearing 23. Hence, lowering of the supporting element 03 in the absence of external manipulation is initially prevented. For the purpose of securing the position, an elastic spring function acts on the adjusting lever or on the latching element. For this purpose, various solutions can be employed. For instance, a tension spring can be employed at the latching element or a torsion spring can be employed in the swivel bearing 23 at the adjusting lever 21. At least the latching element 20 latches in the latching engagement 24 with the bottom element 05. Hence, a backward movement of the bottom element 05 starting from the set-down position is initially prevented. It is also evident that the compression spring needs to be disposed between the bottom element 05 and the housing 02.

Figure 4:
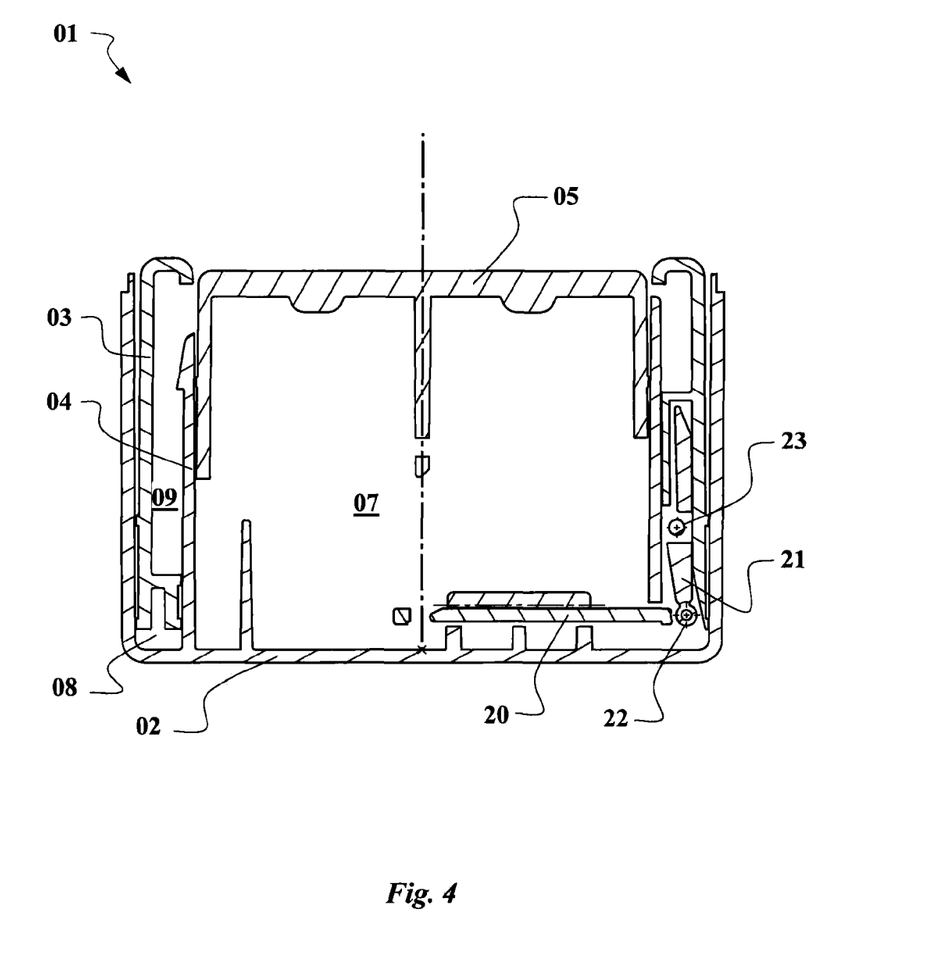
FIG. 4 illustrates a sectional view of the drinking vessel holder 01 of FIG. 2 in the rest position.

In addition to the cross-sectional view of FIG. 3 FIG. 4 shows the drinking vessel holder 02 in the rest position analogous to FIG. 2. Again, the externally surrounding housing 02 having the supporting element 03 arranged therein is shown. Here, the supporting element is almost completely retracted into the housing 02 and thus, as is clearly illustrated, the annular piston chamber 08 is reduced to a small volume. On the other hand an intermediate space 09 is created between the supporting element 03 and the drinking vessel receptacle 04 disposed therein. The bottom element 05 is disposed within the drinking vessel receptacle 04 in the elevated rest position. Hence, the bottom element 05 is essentially disposed at the same height as the upper edge of the supporting element 03.

In the present case it is also apparent how the volume of the piston chamber 07 is enlarged with respect to the piston chamber 07 of FIG. 3 in the set-down position.

Moreover, the latching function in the rest position is shown. Here, the latching element 20 is disposed so as to be pulled out of the latching mechanism 24. Moreover, the adjusting lever 21 in the present case is disposed in a vertical position. Hence, the swivel movement of the adjusting lever 21 and the effect thereof on the latching element 20 is apparent.

Here again, the necessary compression spring between the bottom element 05 and the housing 02 is not illustrated but is clearly obvious for the person skilled in the art.

FIG. 5 again illustrates a cross-sectional view of the drinking vessel holder 01 in the set-down position. Here, the cross-sectional position is selected so as to deviate from the plane of FIG. 3. Together with the illustration of FIG. 3 the arrangement of the retaining elements 15 is apparent. Here, the retaining elements are composed of scoop-shaped elements primarily in the form of retaining elements 15a, 15b. Each retaining element 15 is arranged so as to be swivelable via a corresponding rotational axis 16. Upon lifting of the supporting element 03 from the rest position into the illustrated set-down position, a swivel movement of each retaining element 15 from a position in the intermediate space 09 into the receiving space 06 is caused. To enable a uniform movement, each retaining element 15 has a sliding edge or a sliding surface 17. The retaining element 15 slides along said sliding edge 17 along the upper edge of the drinking vessel receptacle 04.

Figure 5:
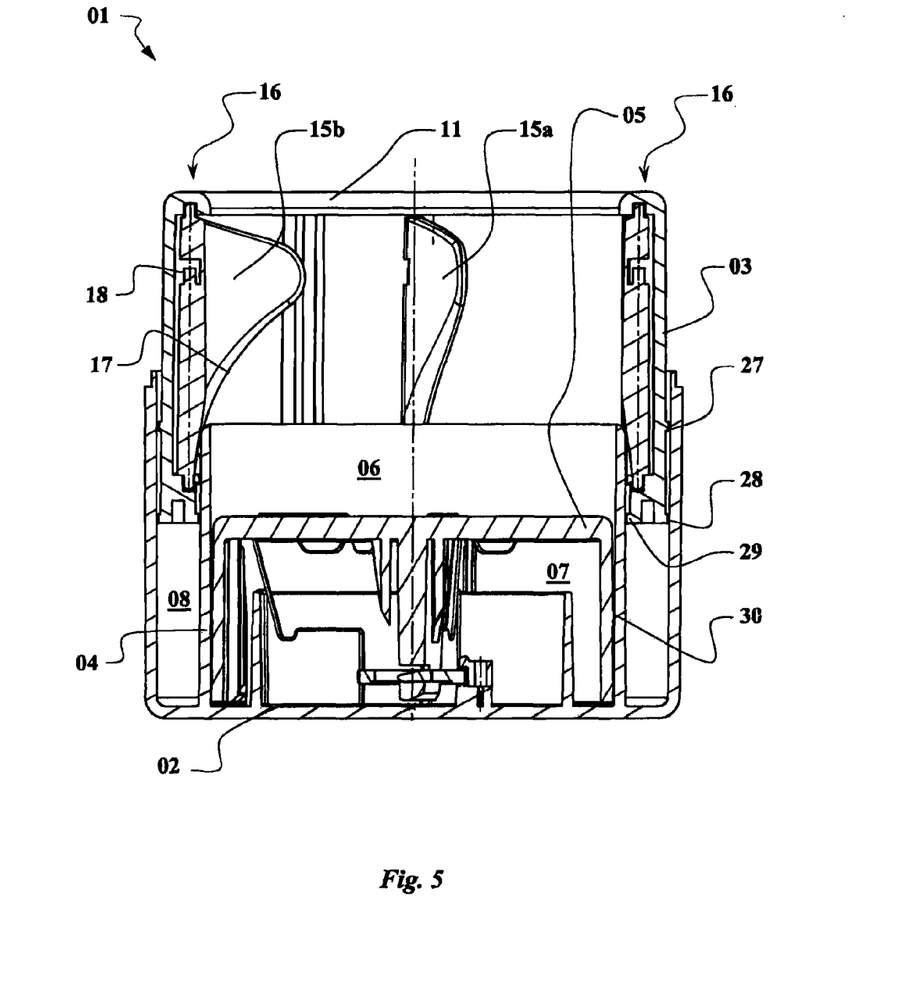
FIG. 5 illustrates a second sectional view of the drinking vessel holder 01 of FIG. 1 in the set-down position.

The swivel movement into the receiving space 06 is caused by a spring function which in the present case is triggered by a torsion spring (not illustrated) disposed on a spring seat 18 at the rotational axis 16. Hence, it is apparent how the spring presses the retaining element 15 via the sliding edge 17 against the drinking vessel receptacle 04. As soon as a drinking vessel is set down, the retaining element 15 abuts against the drinking vessel and the sliding edge is not in contact with the drinking vessel receptacle 04 any more.

Moreover, FIG. 5 reveals the arrangement of annular guides 27-30, serving as sealing lips, at the supporting element 03 and at the bottom element 05. Here, the supporting element 03 features an upper external annular guide 27, a lower external annular guide 28 and a lower internal annular guide 29. Hence, it is easily possible to adjust the gap between the supporting element 03 and the housing 0 or the drinking vessel receptacle 04 to the desired size. Moreover, the selectively provided annular guides 27-29 enhance the guiding function of the supporting element 03 in the housing 02 or in the drinking vessel receptacle 04. The same applies to the bottom element 05 having the upper annular guide 30. The second guiding region of the bottom element 05 in the case of the pot-like design is situated at the lower edge of the bottom element 05. Hence, an adjustment to the manufacture-related tolerances for setting an optimal gap is also advantageously possible here, and an advantageous guiding function of the bottom element 05 in the drinking vessel receptacle 04 is realized.

The invention claimed is:
1. A drinking vessel holder comprising:
a housing;
a drinking vessel receptacle arranged in the housing;
a height-adjustable bottom element, wherein the bottom element is arranged in the drinking vessel receptacle and can be displaced between an upper rest position and a lower set-down position, wherein a drinking vessel can be set down on the bottom element in the drinking vessel receptacle;

a positionally adjustable supporting element, wherein the supporting element in the set-down position extends above the drinking vessel receptacle and prevents the drinking vessel from toppling over, wherein the bottom element in the drinking vessel receptacle forms a first piston or else is connected to a first piston and the supporting element forms an annular piston between the housing and the drinking vessel receptacle or else is connected to at least one second piston, wherein downward movement of at least one of the first piston, the second piston, and the annular piston causes at least one of fluid-overpressure and fluid underpressure; and a latching engagement, wherein when the bottom element is depressed into the set-down position, at least one of the bottom element and the supporting element latches, via the latching engagement, at least one of the housing and the drinking vessel receptacle and prevents a movement of the bottom element into the rest position, and the latching engagement is produced by a swivelable adjusting lever which is vertically disposed between the drinking vessel receptacle and the supporting element and by a latching element which is coupled thereto and is horizontally disposed below the bottom element.

2. The drinking vessel holder according to claim 1, in which at least one of the bottom element and the supporting element is lifted when there is fluid overpressure below the at least one of the bottom element and the supporting element.

3. The drinking vessel holder according to claim 1, in which at least one of the bottom element and the supporting element is lowered when there is fluid underpressure below the at least one of the bottom element and the supporting element.

4. The drinking vessel holder according to claim 1, in which the bottom element, the drinking vessel receptacle and the supporting element include a circular shape forming part of one of the first piston and the annular piston.

5. The drinking vessel holder according to claim 1, in which only a small gap is present between at least one of the bottom element serving as the first piston and the drinking vessel receptacle and the supporting element serving as an annular piston and the drinking vessel receptacle and the supporting element serving as an annular piston and the housing.

6. The drinking vessel holder according to claim 5, in which at least one of the bottom element along its circumference forming the first piston and the supporting element along at least one of an inner and an outer circumference forming the annular piston includes at least one annular guide.

7. The drinking vessel holder according to claim 5, in which the bottom element along its circumference forming at least one of the piston and the supporting element along at least one of an inner and an outer circumference forming the annular piston includes at least one annular sealing lip serving as a guide and for tolerance compensation.

8. The drinking vessel holder according to claim 7, in which the sealing lip is integrally connected to the bottom element or the supporting element.

9. The drinking vessel holder according to claim 1 in which the latching engagement is released by depression of the supporting element.

10. The drinking vessel holder according to claim 1, in which the upper end of the adjusting lever is pressed against the supporting element with the aid of an elastic spring function.

11. The drinking vessel holder according to claim 1, in which a plurality of swivelable retaining elements are disposed in the supporting element, wherein the retaining elements in the rest position are arranged so as to be swiveled into an intermediate space between the supporting element and the drinking vessel receptacle and in the set-down position are arranged so as to be swiveled into the receiving space.

12. The drinking vessel holder according to claim 11, in which each retaining element is pressed by means of a spring element toward the center of the drinking vessel holder or the drinking vessel to be retained.

13. The drinking vessel holder according to claim 11, in which each retaining element features a sliding edge or a sliding surface, which can slide along an upper edge at the drinking vessel receptacle and which causes backward swiveling of the retaining element into the intermediate space when the supporting element is lowered.

* * * * *